United States Patent
Kim

(10) Patent No.: US 9,148,648 B2
(45) Date of Patent: Sep. 29, 2015

(54) APPARATUS AND METHOD FOR PROVIDING IMAGES IN WIRELESS COMMUNICATION SYSTEM AND PORTABLE DISPLAY APPARATUS AND METHOD FOR DISPLAYING IMAGES

(75) Inventor: Young Il Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 999 days.

(21) Appl. No.: 13/289,285

(22) Filed: Nov. 4, 2011

(65) Prior Publication Data

US 2012/0127274 A1    May 24, 2012

(30) Foreign Application Priority Data

Nov. 8, 2010  (KR) .................. 10-2010-0110423

(51) Int. Cl.
*H04N 13/02* (2006.01)
*H04N 15/00* (2006.01)
*H04N 13/00* (2006.01)

(52) U.S. Cl.
CPC ....... *H04N 13/0059* (2013.01); *H04N 13/0048* (2013.01)

(58) Field of Classification Search
CPC ................... H04N 13/0048; H04N 13/0059
USPC ............................................ 348/46
See application file for complete search history.

(56) References Cited

U.S. PATENT DOCUMENTS

| | | | | |
|---|---|---|---|---|
| 8,923,913 B2* | 12/2014 | Tohzaka et al. | ............... | 455/524 |
| 8,994,716 B2* | 3/2015 | Malik | ............. | 345/419 |
| 2003/0224772 A1* | 12/2003 | Patzer et al. | ............... | 455/419 |
| 2008/0310499 A1* | 12/2008 | Kim et al. | ............... | 375/240.01 |
| 2009/0111473 A1* | 4/2009 | Tao et al. | ............. | 455/440 |
| 2010/0226288 A1* | 9/2010 | Scott et al. | ............... | 370/260 |
| 2012/0069146 A1* | 3/2012 | Lee et al. | ............... | 348/43 |

FOREIGN PATENT DOCUMENTS

| | | |
|---|---|---|
| KR | 10-2007-0061227 | 6/2007 |
| KR | 10-2009-0065022 | 6/2009 |
| KR | 10-2009-0066191 | 6/2009 |
| KR | 10-2010-0057921 | 6/2010 |

* cited by examiner

*Primary Examiner* — Anner Holder
(74) *Attorney, Agent, or Firm* — Staas & Halsey LLP

(57) ABSTRACT

A mobile communication system for displaying a three-dimensional (3D) image is provided. The mobile communication system includes an image providing apparatus to generate a first two-dimensional (2D) image Transport Stream (TS), and a second 2D image TS by capturing the same target in different directions, a Multicast Broadcast Service (MBS) server to control at least two base stations included in an MBS area to individually transmit the first 2D image TS and the second 2D image TS, and a portable display apparatus to receive the first 2D image TS and the second 2D image TS, to divide the first 2D image TS and the second 2D image TS into first 2D image data and second 2D image data, respectively, and to display a 2D image or a 3D image based on an image quality of each of the first 2D image data and the second 2D image data.

14 Claims, 6 Drawing Sheets

APPARATUS AND METHOD FOR PROVIDING IMAGES IN WIRELESS COMMUNICATION SYSTEM AND PORTABLE DISPLAY APPARATUS AND METHOD FOR DISPLAYING IMAGES

BACKGROUND OF THE INVENTION

1. Field of the Invention

Embodiments of the present invention relate to an apparatus and method for providing images in a mobile communication system, and a portable display apparatus and method for displaying images.

2. Description of the Related Art

Recently, with increasing interest in three-dimensional (3D) images, a mobile communication system, such as an Internet Protocol Television (IPTV) system to provide a 3D image to a portable display apparatus using a wireless communication network is developed. The portable display apparatus may receive a 3D image from an image providing apparatus connected via the wireless communication network, and may display the received 3D image. A quality of the 3D image displayed on the portable display apparatus may vary based on an environment of the wireless communication network. Accordingly, to provide a 3D image with good quality to the portable display apparatus, the environment of the wireless communication network needs to be maintained to enable a 3D image to be easily transmitted and received.

To improve the environment of the wireless communication network, a mobile communication system based on $3^{rd}$ Generation Partnership Project/Long Term Evolution (3GPP/LTE) and based on the Institute of Electrical and Electronics Engineers (IEEE) 802.16m may employ a Multicast Broadcast Service (MBS) technology.

The MBS technology enables multiple base stations included in an MBS area to simultaneously transmit the same content to all users requesting a broadcasting service. When a 3D image providing apparatus transmits a 3D image to the multiple base stations included in the MBS area, the multiple base stations may transmit the 3D image to a portable display apparatus. Accordingly, the multiple base stations may have a high transmission rate, which may result in inefficient use of wireless communication resources. In other words, since the wireless communication network becomes unstable due to the high transmission rate, the 3D image may be damaged, or may be abnormally transmitted. A user of the portable display apparatus may view a 3D image with a low quality, and accordingly a satisfaction level of the user may be reduced, compared to when viewing a two-dimensional (2D) image. The above problem may occur in a mobile communication system that transmits content using a typical wireless communication technology, as well as, in a mobile communication system that transmits content using the MBS technology.

SUMMARY OF THE INVENTION

An aspect of embodiments of the present invention is to provide a mobile communication system, and an image providing apparatus and method that may individually transmit a first two-dimensional (2D) image Transport Stream (TS), and a second 2D image TS that are generated by capturing the same target in different directions, to a portable display apparatus through at least two base stations included in a Multicast Broadcast Service (MBS) area, thereby to provide a three-dimensional (3D) image by efficiently using wireless communication resources.

Another aspect of embodiments of the present invention is to provide a portable display apparatus and method for displaying images that may analyze an image quality for each of a first 2D image TS and a second 2D image TS, and may display a 2D image or a 3D image based on a result of analyzing the image quality, thereby to improve Quality of Experience (QoE) for the 3D image.

According to an aspect of the present invention, there is provided a mobile communication system, including: an image providing apparatus to generate a first 2D image TS, and a second 2D image TS by capturing the same target in different directions, to generate a 3D image; a Multicast Broadcast Service (MBS) server to control at least two base stations to individually transmit the first 2D image TS and the second 2D image TS, the at least two base stations being included in an MBS area; and a portable display apparatus to receive the first 2D image TS and the second 2D image TS from the at least two base stations, to divide the first 2D image TS and the second 2D image TS into first 2D image data and second 2D image data, respectively, and to display a 2D image or a 3D image based on an image quality of each of the first 2D image data and the second 2D image data.

According to another aspect of the present invention, there is provided a mobile communication system, including: an image providing apparatus to generate a first 2D image TS, and a second 2D image TS by capturing the same target in different directions, to generate a 3D image; a content server to transmit the first 2D image TS via a first base station included in a first wireless communication network, and to transmit the second 2D image TS via a second base station included in a second wireless communication network; a multi-access terminal apparatus to receive the first 2D image TS from the first base station by accessing the first wireless communication network, to receive the second 2D image TS from the second base station by accessing the second wireless communication network, and to restore the first 2D image TS and the second 2D image TS; and a portable display apparatus to receive the first 2D image TS and the second 2D image TS from the multi-access terminal apparatus, to divide the first 2D image TS and the second 2D image TS into first 2D image data and second 2D image data, respectively, and to display a 2D image or a 3D image based on an image quality of each of the first 2D image data and the second 2D image data.

According to still another aspect of the present invention, there is provided an image providing apparatus, including: a 2D image generator to generate a first 2D image Elementary Stream (ES) and a second 2D image ES by capturing the same target in different directions, to generate a 3D image; a packetizer to packetize the first 2D image ES and the second 2D image ES; a TS generator to generate a first 2D image TS and a second 2D image TS, respectively, based on the packetized first 2D image ES and the packetized second 2D image ES; a multiplexer (MUX) to multiplex the first 2D image TS and the second 2D image TS generated by the TS generator; and a TS transmitter to individually transmit, to a portable display apparatus, the multiplexed first 2D image TS and the multiplexed second 2D image TS through at least two base stations connected via a wireless communication network.

According to yet another aspect of the present invention, there is provided a portable display apparatus, including: a wireless communication unit to receive a first 2D image TS, and a second 2D image TS, to generate a 3D image; a demultiplexer (DEMUX) to demultiplex the first 2D image TS and the second 2D image TS, and to separate image information and control information; an image separating unit to separate first 2D image data and second 2D image data from the image information; an image quality analyzing unit to analyze an image quality for each of the first 2D image data and the second 2D image data; and a display unit to display, as a 2D image or a 3D image, the first 2D image data and the second 2D image data, based on the analyzed image quality.

According to a further aspect of the present invention, there is provided an image providing method, including: generating a first 2D image ES and a second 2D image ES by capturing the same target in different directions, to generate a 3D image; packetizing the first 2D image ES and the second 2D image ES; generating a first 2D image TS and a second 2D image TS, respectively, based on the packetized first 2D image ES and the packetized second 2D image ES; multiplexing the generated first 2D image TS and the generated second 2D image TS; and individually transmitting, to a portable display apparatus, the multiplexed first 2D image TS and the multiplexed second 2D image TS through at least two base stations connected via a wireless communication network.

According to a further aspect of the present invention, there is provided an image display method, including: receiving a first 2D image TS, and a second 2D image TS, to generate a 3D image; demultiplexing the first 2D image TS and the second 2D image TS, and separating image information and control information; separating first 2D image data and second 2D image data from the image information; analyzing an image quality for each of the first 2D image data and the second 2D image data; and displaying, as a 2D image or a 3D image, the first 2D image data and the second 2D image data, based on the analyzed image quality.

DETAILED DESCRIPTION OF EMBODIMENTS

Figure 1:
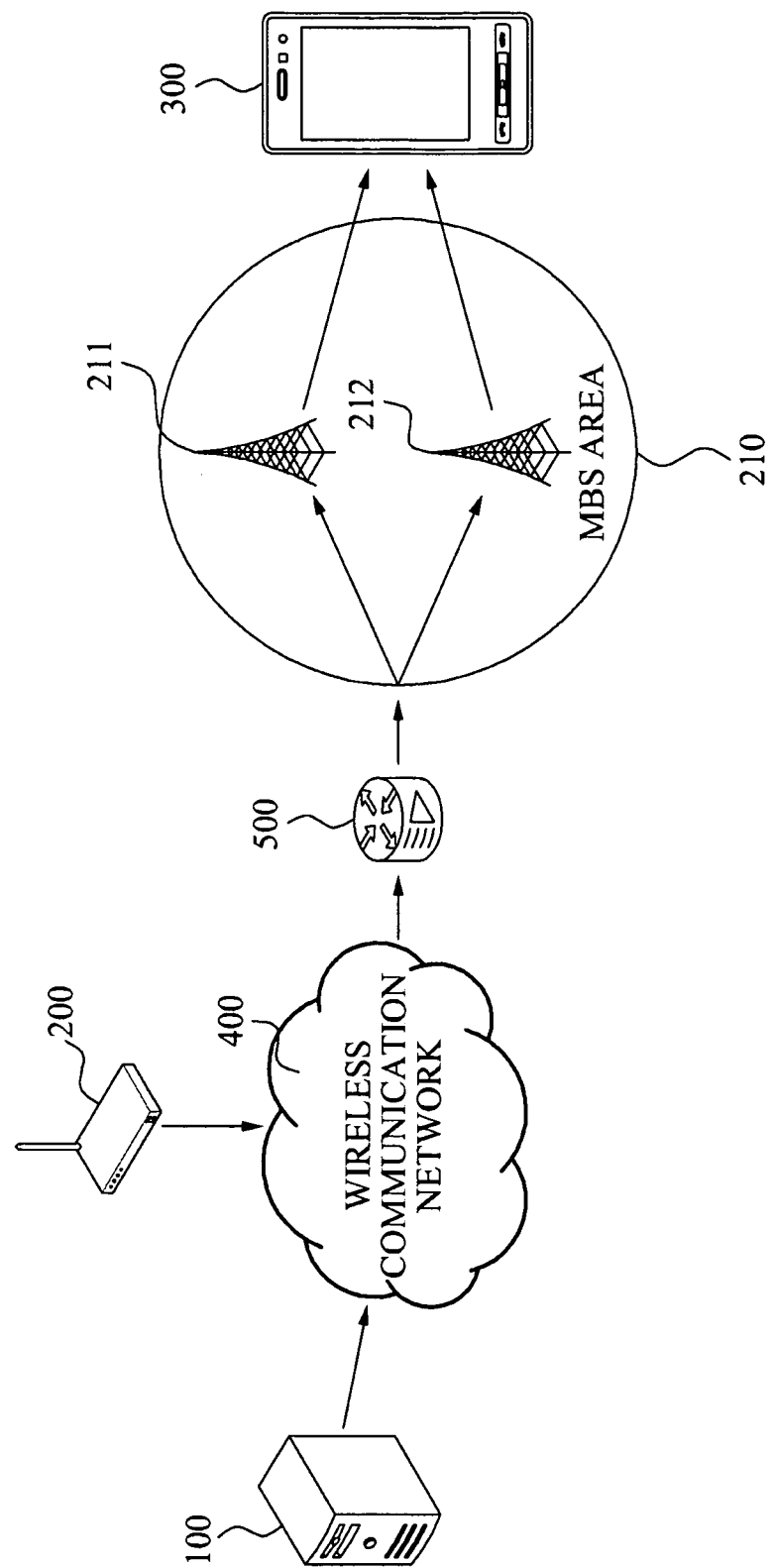
FIG. 1 is a diagram illustrating a mobile communication system according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating a mobile communication system according to an embodiment of the present invention. The mobile communication system of FIG. 1 may be an Internet Protocol Television (IPTV) system employing a wireless communication network, and may provide a three-dimensional (3D) image to a portable display apparatus so that the portable display apparatus may display the 3D image.

The mobile communication system may include an image providing apparatus 100, a Multicast Broadcast Service (MBS) server 200, a first base station 211, a second base station 212, and a portable display apparatus 300.

To generate a 3D image, the image providing apparatus 100 may generate a first two-dimensional (2D) image Transport Stream (TS), and a second 2D image TS by capturing the same target in different directions. Specifically, the image providing apparatus 100 may capture the same target in a first direction (for example, a left direction), and in a second direction (for example, a right direction) that is opposite to the first direction, using two stereo cameras (not shown), and may generate a first 2D image Elementary Stream (ES), and a second 2D image ES, respectively. Here, the two stereo cameras may be connected to, or included in the image providing apparatus 100.

The first 2D image ES and the second 2D image ES may be used to generate a 3D image. In other words, the 3D image may be generated by combining the first 2D image ES and the second 2D image ES that are generated by the image providing apparatus 100.

The image providing apparatus 100 may packetize the first 2D image ES and the second 2D image ES, and may generate TSs. In other words, the image providing apparatus 100 may generate the first 2D image TS and the second 2D image TS.

The image providing apparatus 100 may multiplex the first 2D image TS and the second 2D image TS, and may transmit, to the portable display apparatus 300, the multiplexed first 2D image TS and the multiplexed second 2D image TS.

The image providing apparatus 100 may use the first base station 211 and the second base station 212 that are connected via a wireless communication network 400, to transmit the first 2D image TS and the second 2D image TS to the portable display apparatus 300, respectively.

Specifically, the image providing apparatus 100 may transmit the first 2D image TS and the second 2D image TS to the MBS server 200 connected via the wireless communication network 400.

When the first 2D image TS and the second 2D image TS are received, the MBS server 200 may set an MBS area 210, and may allocate wireless communication resources to the first base station 211 and the second base station 212 that are included in the MBS area 210.

The MBS server 200 may transmit the first 2D image TS and the second 2D image TS to the first base station 211 and the second base station 212 through an Access Service Network (ASN) gateway 500. Additionally, the MBS server 200 may control the first base station 211 and the second base station 212 to transmit the first 2D image TS and the second 2D image TS to the portable display apparatus 300.

In other words, the first base station 211 may transmit the first 2D image TS to the portable display apparatus 300, and the second base station 212 may transmit the second 2D image TS to the portable display apparatus 300. In this instance, the first base station 211 and the second base station 212 may respectively transmit the first 2D image TS and the second 2D image TS at the same speed, and in image frame units corresponding to each other.

When the first 2D image TS and the second 2D image TS are received from the first base station 211 and the second base station 212, the portable display apparatus 300 may divide the first 2D image TS and the second 2D image TS into first 2D image data and second 2D image data, respectively, and may analyze an image quality. Specifically, the portable display apparatus 300 may restore the first 2D image TS and the second 2D image TS to a single TS, and may separate image information and control information from the single TS. The image information may include image data, and a Cyclic Redundancy Checking (CRC) value of the image data. The control information may include metadata and display information that are associated with image data.

The portable display apparatus 300 may separate, from the image information, the first 2D image data corresponding to the first 2D image TS, and the second 2D image data corresponding to the second 2D image TS. Additionally, the image quality may be analyzed for each of the first 2D image data and the second 2D image data. To analyze the image quality, a CRC may be performed on each of the first 2D image data and the second 2D image data.

The portable display apparatus 300 may display, as a 2D image or a 3D image, at least one of the first 2D image data and the second 2D image data, based on the analyzed image quality.

As a result of analyzing the image quality, when both the first 2D image data and the second 2D image data are determined to have good image qualities, the portable display apparatus 300 may combine the first 2D image data and the second 2D image data into a 3D image, and may display the 3D image.

Conversely, when one of the first 2D image data and the second 2D image data is determined to have a good image quality, and the other image data is determined to have a poor image quality, the portable display apparatus 300 may display 2D image data with the good image quality.

In other words, when either the first 2D image TS, or the second 2D image TS is damaged or is abnormally transmitted, due to an unstable wireless communication network, the portable display apparatus 300 may display 2D image data with a high image quality, instead of displaying a 3D image with a low image quality.

In the mobile communication system of FIG. 1, the first 2D image TS and the second 2D image TS may be stably transmitted, and a 2D image or a 3D image may be provided based on the image quality for each of first 2D image data corresponding to the first 2D image TS and second 2D image data corresponding to the second 2D image TS. Thus, it is possible to improve Quality of Experience (QoE) for the 3D image.

Figure 2:
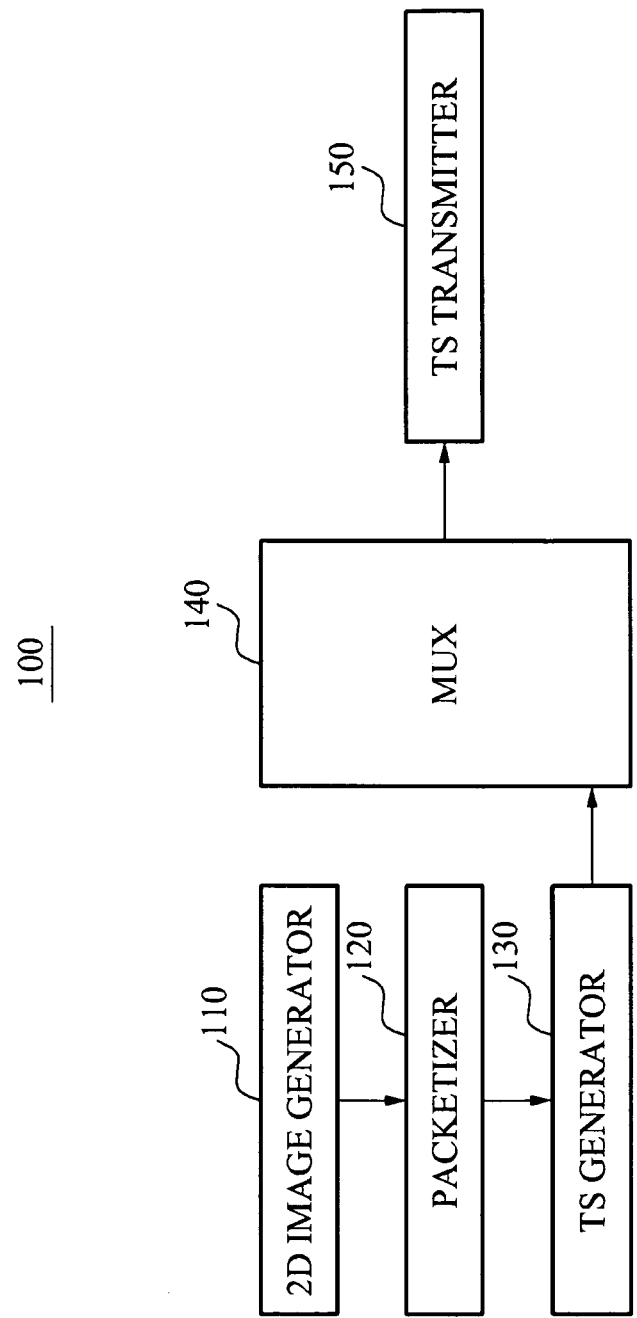
FIG. 2 is a block diagram illustrating a configuration of an image providing apparatus according to an embodiment of the present invention.

FIG. 2 is a block diagram illustrating a configuration of an image providing apparatus according to an embodiment of the present invention. Referring to FIG. 2, the image providing apparatus 100 may include a 2D image generator 110, a packetizer 120, a TS generator 130, a multiplexer (MUX) 140, and a TS transmitter 150.

The 2D image generator 110 may include, for example, two stereo cameras. The two stereo cameras may be connected to or included in the image providing apparatus 100. The 2D image generator 110 may generate a first 2D image ES by capturing the same target in a first direction, and may generate a second 2D image ES by capturing the same target in a second direction opposite to the first direction. One of the first direction and the second direction may be a left direction of the same target, and the other may be a right direction of the same target.

The packetizer 120 may packetize the first 2D image ES and the second 2D image ES that are generated by the 2D image generator 110, to obtain a first Packetized Elementary Stream (PES) and a second PES.

The TS generator 130 may generate TSs based on the first PES, and the second PES. In other words, the TS generator 130 may generate a first 2D image TS, and a second 2D image TS.

The MUX 140 may multiplex the first 2D image TS and the second 2D image TS that are generated by the TS generator 130.

The TS transmitter 150 may individually transmit, to the portable display apparatus 300, the multiplexed first 2D image TS and the multiplexed second 2D image TS through at least two base stations connected via the wireless communication network 400.

Specifically, the TS transmitter 150 may transfer, to the MBS server 200 via the wireless communication network 400, transmission information and transmission control information that are associated with the first 2D image TS and the second 2D image TS. Subsequently, the MBS server 200 may set the MBS area 210, and may allocate wireless communication resources to the first base station 211 and the second base station 212 that are included in the MBS area 210. Additionally, the MBS server 200 may control the first base station 211 to transmit the first 2D image TS to the portable display apparatus 300, and may control the second base station 212 to transmit the second 2D image TS to the portable display apparatus 300. In this instance, the first 2D image TS and the second 2D image TS may be transmitted at the same speed, and in image frame units corresponding to each other.

As described above, the TS transmitter 150 may individually transmit the first 2D image TS and the second 2D image TS through the first base station 211 and the second base station 212, and accordingly wireless communication resources may be efficiently used. Thus, the first 2D image TS and the second 2D image TS may be stably transmitted, compared to transmitting a 3D image TS.

Figure 3:
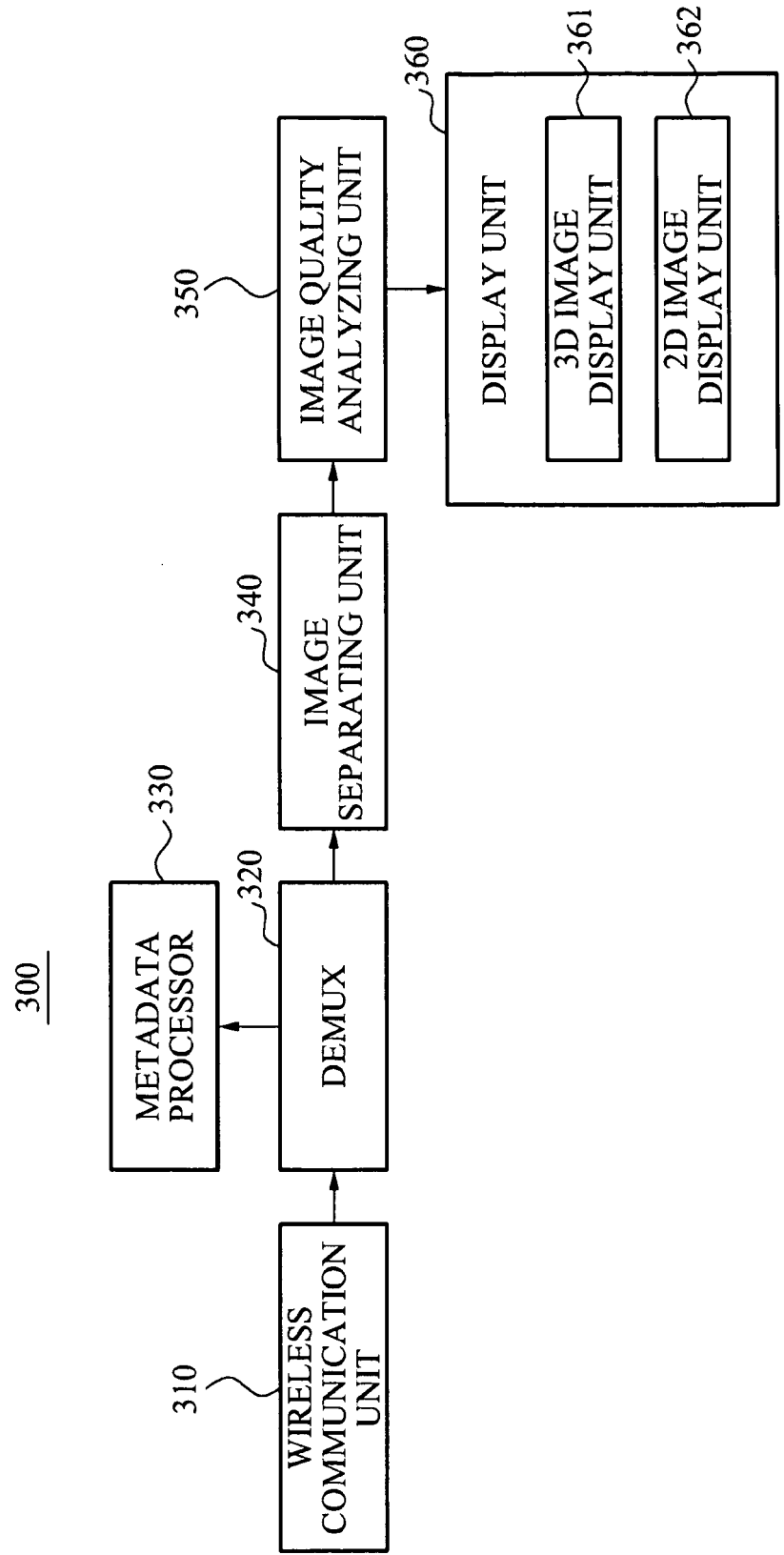
FIG. 3 is a block diagram illustrating a configuration of a portable display apparatus according to an embodiment of the present invention.

FIG. 3 is a block diagram illustrating a configuration of a portable display apparatus according to an embodiment of the present invention. The portable display apparatus 300 may enable wireless communication, and may be a digital device, for example, a mobile phone, a Portable Media Player (PMP), an electronic dictionary, a Digital Multimedia Broadcasting (DMB) player, a navigation, and the like.

Referring to FIG. 3, the portable display apparatus 300 may include a wireless communication unit 310, a demultiplexer (DEMUX) 320, a metadata processor 330, an image separating unit 340, an image quality analyzing unit 350, and a display unit 360.

The wireless communication unit 310 may receive a first 2D image TS and a second 2D image TS that are used to generate a 3D image, from at least two base stations connected via the wireless communication network 400.

Although not shown in the drawings, the portable display apparatus 300 may include a Physical Layer (PHY) configuration to perform PHY processing on the first 2D image TS and the second 2D image TS received by the wireless communication unit 310, and a baseband extracting configuration to extract baseband signals from the first 2D image TS and the second 2D image TS. Additionally, a Medium Access Control (MAC) layer configuration to restore the first 2D image TS and the second 2D image TS to a single TS may be further included.

The DEMUX 320 may demultiplex the first 2D image TS and the second 2D image TS restored to the signal TS, and may separate image information and control information. The image information may include first 2D image data corresponding to the first 2D image TS, second 2D image data corresponding to the second 2D image TS, and a CRC value of each of the 2D image data. Additionally, the control information may include metadata and display information that are associated with each of the 2D image data.

When the image information and the control information are separated, the DEMUX 320 may provide the image information to the image separating unit 340, and may transmit the control information to the metadata processor 330.

The image separating unit 340 may separate the first 2D image data and the second 2D image data, from the image information.

The image quality analyzing unit 350 may analyze the image quality for each of the first 2D image data and the second 2D image data. Specifically, the image quality analyzing unit 350 may perform a CRC on each of the first 2D image data and the second 2D image data, and may analyze the image quality, depending on whether an error is detected from each of the first 2D image data and the second 2D image data.

Prior to transmitting the first 2D image TS and the second 2D image TS to the portable display apparatus 300, the image providing apparatus 100 of FIG. 2 may compute CRC values using each of the first 2D image TS and the second 2D image TS, may insert the computed CRC values in image information of each of the first 2D image TS and the second 2D image TS, and may transmit each of the first 2D image TS and the second 2D image TS to the portable display apparatus 300.

Subsequently, the image quality analyzing unit 350 may extract a CRC value of the first 2D image data and a CRC value of the second 2D image data that are computed by the image providing apparatus 100. Additionally, the image quality analyzing unit 350 may compute a CRC value of the first 2D image data corresponding to the received first 2D image TS, and a CRC value of the second 2D image data corresponding to the received second 2D image TS.

The image quality analyzing unit 350 may compare the extracted CRC value with the computed CRC value, for each of the first 2D image data and the second 2D image data, may determine that an error is not detected when the two CRC values are identical to each other, and may determine that an error is detected when the two CRC values are different from each other. For example, when the extracted CRC value and the computed CRC value for the first 2D image data are identical to each other, an error may not be detected. Conversely, when the extracted CRC value and the computed CRC value for the second 2D image data are different from each other, an error may be detected.

As a result of the CRC, when no error is detected from the first 2D image data and the second 2D image data, the image quality analyzing unit 350 may determine that the first 2D image data and the second 2D image data have good image qualities. Conversely, when an error is detected from at least one of the first 2D image data and the second 2D image data, an image quality of 2D image data, from which the error is detected, may be determined to be poor.

The display unit 360 may include a 3D image display unit 361 to display a 3D image, and a 2D image display unit 362 to display a 2D image.

The display unit 360 may display, as a 2D image or a 3D image, at least one of the first 2D image data and the second 2D image data, based on the analyzed image quality.

Specifically, when both the first 2D image data and the second 2D image data are determined to have good image qualities, the display unit 360 may combine the first 2D image data and the second 2D image data into a 3D image, and may display the 3D image using the 3D image display unit 361.

Additionally, when one of the first 2D image data and the second 2D image data is determined to have a good image quality, and the other image data is determined to have a poor image quality, the display unit 360 may display 2D image data with the good image quality using the 2D image display unit 362.

For example, when both the first 2D image data and the second 2D image data are determined to have poor image qualities, the display unit 360 may terminate displaying an image, or may perform displaying in the same manner as displaying of previous image data. When the displaying is terminated, the display unit 360 may display a message stating that the displaying is terminated, and may notify a user of the termination of the displaying.

The display unit 360 of FIG. 3 includes the 2D image display unit 362 as described above, however, the 2D image display unit 362 may include a first 2D image display unit to display the first 2D image data captured in the first direction, and a second 2D image display unit to display the second 2D image data captured in the second direction. Accordingly, when an image quality of one of 2D image data is poor, 2D image data with a good image quality may be displayed by a 2D image display unit in a corresponding direction.

The portable display apparatus 300 of FIG. 3 may analyze the image quality for each of the first 2D image data and the second 2D image data, may display a 3D image when both the first 2D image data and the second 2D image data are good in image quality, and may display only 2D image data with a good image quality when only either the first 2D image data or the second 2D image data is good in image quality. Accordingly, when 2D image data is damaged, a 2D image with a high image quality may be displayed, instead of a 3D image with a low image quality being displayed. Thus, it is possible to improve QoE.

Figure 4:
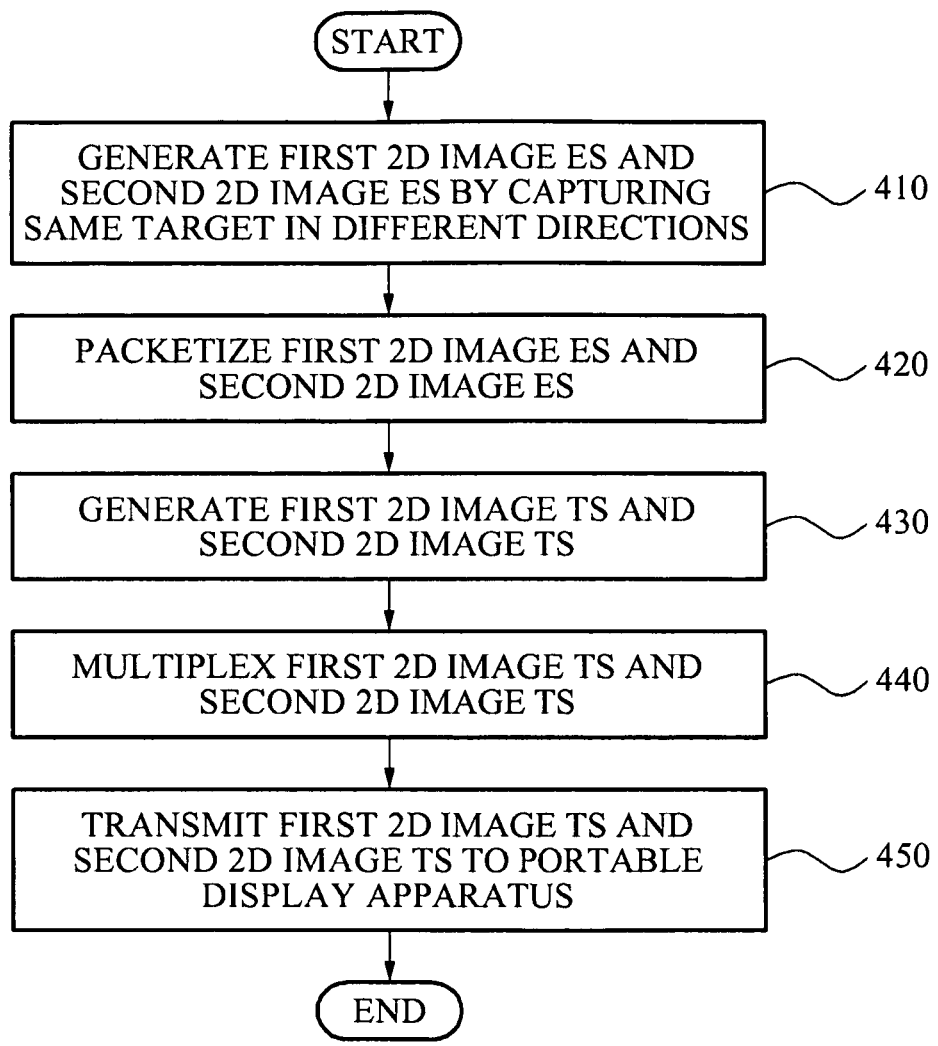
FIG. 4 is a flowchart illustrating an image providing method according to an embodiment of the present invention.

FIG. 4 is a flowchart illustrating an image providing method according to an embodiment of the present invention. The image providing method may be performed by the image providing apparatus 100 of FIG. 2.

Referring to FIG. 4, in operation 410, the image providing apparatus 100 may generate a first 2D image ES and a second 2D image ES by capturing the same target in different directions. Specifically, the same target may be captured using two stereo cameras placed in a first direction (for example, a left direction) and a second direction (for example, a right direction), and the first 2D image ES and the second 2D image ES may be generated.

In operation 420, the image providing apparatus 100 may packetize the first 2D image ES and the second 2D image ES. In operation 430, the image providing apparatus 100 may generate TSs based on the first 2D image ES and the second 2D image ES. In other words, a first 2D image TS and a second 2D image TS may be generated.

The image providing apparatus 100 may multiplex the first 2D image TS and the second 2D image TS in operation 440, and may transmit, to the portable display apparatus 300, the multiplexed first 2D image TS and the multiplexed second 2D image TS in operation 450.

The image providing apparatus 100 may generate the first 2D image TS and the second 2D image TS that are used to generate a 3D image, and may transmit the first 2D image TS and the second 2D image TS to the portable display apparatus 300 through different base stations. For example, the first 2D image TS may be transmitted via the first base station 211, and the second 2D image TS may be transmitted via the second base station 212.

As described above, the image providing apparatus may generate a first 2D image TS and a second 2D image TS for generation of a 3D image, and may individually transmit the first 2D image TS and the second 2D image TS to the portable display apparatus 300 through different base stations. Thus, it is possible to stably transmit the first 2D image TS and the second 2D image TS, by efficiently using wireless communication resources.

Figure 5:
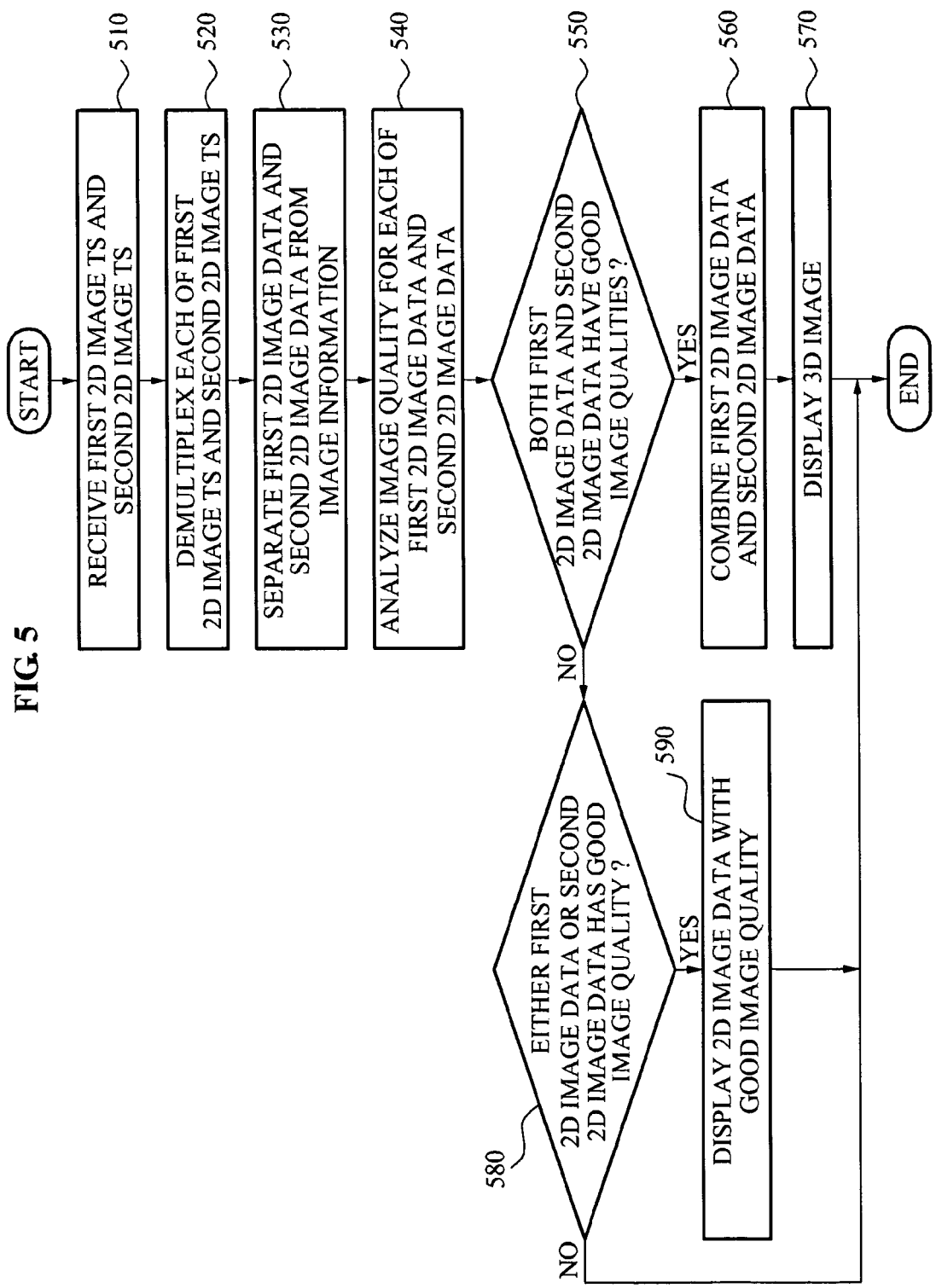
FIG. 5 is a flowchart illustrating an image display method according to an embodiment of the present invention.

FIG. 5 is a flowchart illustrating an image display method according to an embodiment of the present invention. The image display method may be performed by the portable display apparatus 300 of FIG. 3.

Referring to FIG. 5, in operation 510, the portable display apparatus 300 may receive a first 2D image TS and a second 2D image TS that are generated by capturing the same target in different directions. In this instance, one of the first 2D image TS and the second 2D image TS may be obtained by capturing the same target in the left direction, and the other may be obtained by capturing the same target in the right direction.

In operation 520, the portable display apparatus 300 may demultiplex each of the first 2D image TS and the second 2D image TS, and may separate image information and control information.

In operation 530, the portable display apparatus 300 may separate, from the image information, first 2D image data corresponding to the first 2D image TS, and second 2D image data corresponding to the second 2D image TS.

In operation 540, the portable display apparatus 300 may analyze an image quality for each of the first 2D image data and the second 2D image data. Specifically, to determine whether an error is detected, a CRC may be performed on each of the first 2D image data and the second 2D image data. Additionally, whether the image quality is good or poor may be determined depending on whether the error is detected.

As a result of analyzing the image quality, when both the first 2D image data and the second 2D image data are determined to have good image qualities in operation 550, the portable display apparatus 300 may combine the first 2D image data and the second 2D image data into a 3D image in operation 560, and may display the 3D image in operation 570.

Conversely, when both the first 2D image data and the second 2D image data are determined to have poor image qualities in operation 550, the portable display apparatus 300 may determine which one of the first 2D image data and the second 2D image data has a good image quality in operation 580.

When one of the first 2D image data and the second 2D image data is determined to have a good image quality, and the other image data is determined to have a poor image quality, the portable display apparatus 300 may display 2D image data with the good image quality in operation 590.

The portable display apparatus 300 may display a 3D image, only when both the first 2D image data and the second 2D image data are good in the image quality, and may display only 2D image data with good image quality and may provide a 2D image when either the first 2D image data or the second 2D image data is good in the image quality. Thus, it is possible to improve QoE of a user.

Figure 6:
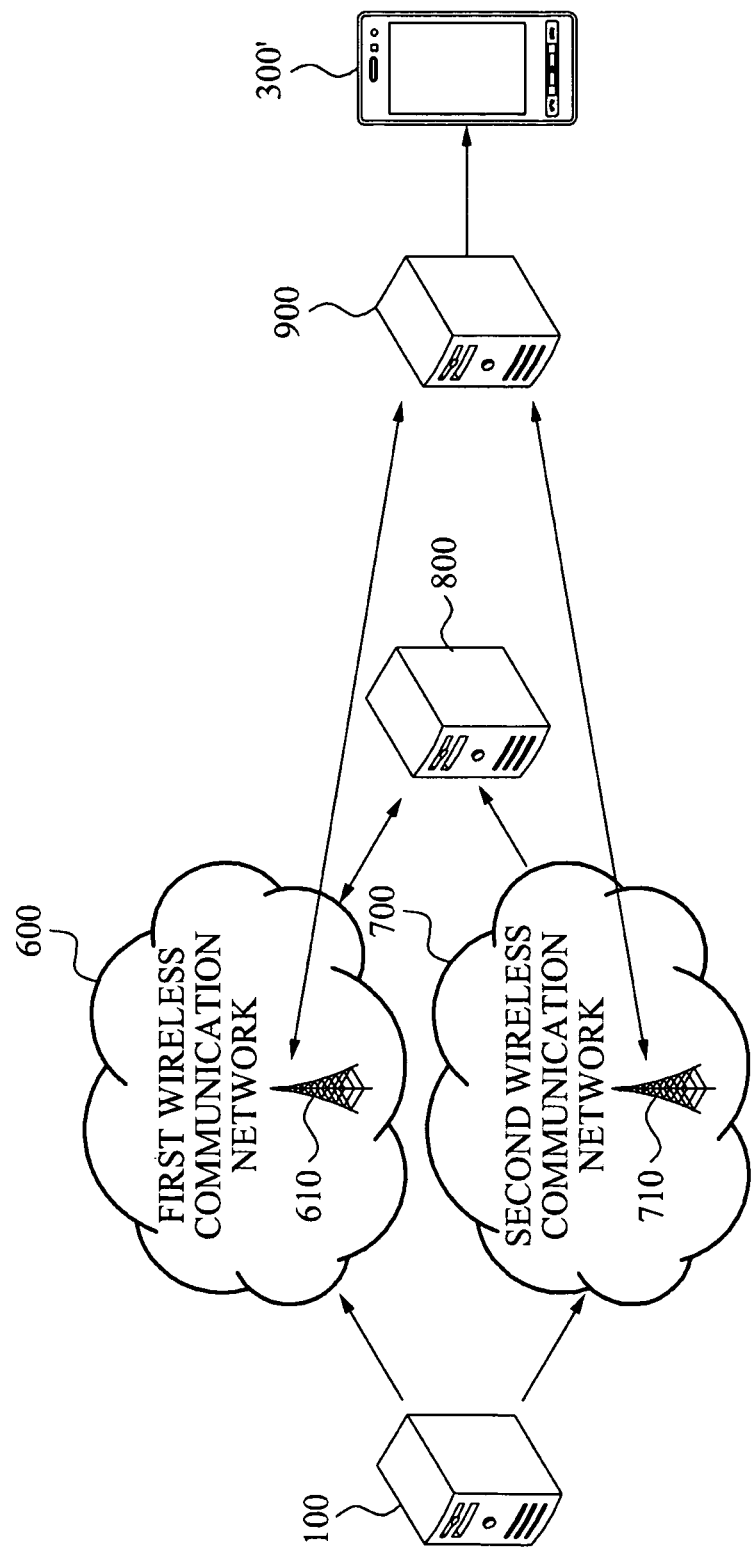
FIG. 6 is a diagram illustrating a mobile communication system according to another embodiment of the present invention.

FIG. 6 is a diagram illustrating a mobile communication system according to another embodiment of the present invention. The mobile communication system of FIG. 6 may be an IPTV system employing a wireless communication network, and may provide a 3D image to a portable display apparatus so that the portable display apparatus may display the 3D image. The mobile communication system of FIG. 6 may provide an image via a mobile communication network, and a Wireless Fidelity (Wi-Fi) communication network, unlike the mobile communication system of FIG. 1 that provides an image through base stations within an MSB area.

The mobile communication system may include an image providing apparatus 100, a first base station 610, a second base station 710, a content server 800, a multi-access terminal apparatus 900, and a portable display apparatus 300'.

The image providing apparatus 100 may have the same configuration and perform the same operation as described above with reference to FIG. 1, and accordingly a further description thereof is omitted.

To generate a 3D image, the image providing apparatus 100 may capture the same target in different directions, and may generate a first 2D image TS and a second 2D image TS.

The image providing apparatus 100 may transmit the first 2D image TS to the content server 800 via a first wireless communication network 600, and may transmit the second 2D image TS to the content server 800 via a second wireless communication network 700. Depending on embodiments, the first wireless communication network 600 may be a mobile communication network, and the second wireless communication network 700 may be a Wi-Fi communication network.

The mobile communication network may be a wireless communication network established by a telecommunications company that a user of the portable display apparatus 300' joins. Additionally, the Wi-Fi communication network may be a near field wireless communication network supported by a wireless Access Point (AC) installed within a predetermined distance from the portable display apparatus 300'.

When the first 2D image TS and the second 2D image TS are received, the content server 800 may control the first base station 610 included in the first wireless communication network 600 to transmit the first 2D image TS to the multi-access terminal apparatus 900, and may control the second base station 710 included in the second wireless communication network 700 to transmit the second 2D image TS to the multi-access terminal apparatus 900.

The first base station 610 may transmit the first 2D image TS to the multi-access terminal apparatus 900, and the second base station 710 may transmit the second 2D image TS to the multi-access terminal apparatus 900. In this instance, the first base station 610 and the second base station 710 may respectively transmit the first 2D image TS and the second 2D image TS at the same speed, and in image frame units corresponding to each other.

The content server 800 may be used to generate or provide content, in association with or in cooperation with the telecommunications company that the user of the portable display apparatus 300' joins.

The multi-access terminal apparatus 900 may receive the first 2D image TS from the first base station 610 by accessing the first wireless communication network 600, and may receive the second 2D image TS from the second base station 710 by accessing the second wireless communication network 700. Additionally, the multi-access terminal apparatus 900 may restore the received first 2D image TS and the received second 2D image TS. In other words, the multi-access terminal apparatus 900 may restore the first 2D image TS and the second 2D image TS to a single TS.

The multi-access terminal apparatus 900 may simultaneously access various wireless communication networks, and accordingly may receive the first 2D image TS and the second 2D image TS by simultaneously accessing the first wireless communication network 600 and the second wireless communication network 700.

Additionally, the single TS obtained by restoring the first 2D image TS and the second 2D image TS may be transmitted to the portable display apparatus 300' via one of the first base station 610 and the second base station 710.

The multi-access terminal apparatus 900 may be used as a server of the telecommunications company that the user of the portable display apparatus 300' joins, or as a separate apparatus to provide various content-related services in association with or in cooperation with the telecommunications company.

The portable display apparatus 300' may perform the same operation as the portable display apparatus 300 of FIG. 1, except for restoring the first 2D image TS and the second 2D image TS.

When the single TS obtained by restoring the first 2D image TS and the second 2D image TS is received from the multi-access terminal apparatus 900, the portable display apparatus 300' may separate image information and control information from the single TS. The image information may include image data, and a CRC value of the image data. The control information may include metadata and display information that are associated with image data.

The portable display apparatus 300' may separate, from the image information, first 2D image data corresponding to the first 2D image TS, and second 2D image data corresponding to the second 2D image TS. Additionally, an image quality may be analyzed for each of the first 2D image data and the second 2D image data. To analyze the image quality, a CRC may be performed on each of the first 2D image data and the second 2D image data.

The portable display apparatus 300' may display, as a 2D image or a 3D image, at least one of the first 2D image data and the second 2D image data, based on the analyzed image quality.

As a result of analyzing the image quality, when both the first 2D image data and the second 2D image data are determined to have good image qualities, the portable display apparatus 300' may combine the first 2D image data and the second 2D image data into a 3D image, and may display the 3D image.

Conversely, when one of the first 2D image data and the second 2D image data is determined to have a good image quality, and the other image data is determined to have a poor image quality, the portable display apparatus 300' may display 2D image data with the good image quality.

In the mobile communication system of FIG. 6, the first 2D image TS and the second 2D image TS may be stably transmitted through different wireless communication networks, respectively. Additionally, a 2D image or a 3D image may be provided based on the image quality for each of the first 2D image data and the second 2D image data and thus, it is possible to improve QoE for the 3D image.

The embodiments of the present invention may be recorded in computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A mobile communication system, comprising:
   an image providing apparatus to generate a first two-dimensional (2D) image Transport Stream (TS), and a second 2D image TS by capturing the same target in different directions, to generate a three-dimensional (3D) image;
   a Multicast Broadcast Service (MBS) server to control at least two base stations to individually transmit the first 2D image TS and the second 2D image TS, the at least two base stations being included in an MBS area; and
   a portable display apparatus to receive the first 2D image TS and the second 2D image TS from the at least two base stations, to divide the first 2D image TS and the second 2D image TS into first 2D image data and second 2D image data, respectively, and to display a 2D image or a 3D image based on an image quality of each of the first 2D image data and the second 2D image data.

2. The mobile communication system of claim 1, wherein the portable display apparatus separates image information and control information from the first 2D image TS and the second 2D image TS, separates the first 2D image data and the second 2D image data from the image information, and analyzes an image quality for each of the first 2D image data and the second 2D image data.

3. The mobile communication system of claim 1, wherein, when both the first 2D image data and the second 2D image data have good image qualities, the portable display apparatus combines the first 2D image data and the second 2D image data into a 3D image, and displays the 3D image.

4. The mobile communication system of claim 1, wherein, when either the first 2D image data or the second 2D image data has a good image quality, the portable display apparatus displays 2D image data with the good image quality.

5. An image providing apparatus, comprising:
   a two-dimensional (2D) image generator to generate a first 2D image Elementary Stream (ES) and a second 2D image ES by capturing the same target in different directions, to generate a three-dimensional (3D) image;
   a packetizer to packetize the first 2D image ES and the second 2D image ES;
   a Transport Stream (TS) generator to generate a first 2D image TS and a second 2D image TS, respectively, based on the packetized first 2D image ES and the packetized second 2D image ES;
   a multiplexer (MUX) to multiplex the first 2D image TS and the second 2D image TS generated by the TS generator; and
   to a TS transmitter to individually transmit, to a portable display apparatus, the multiplexed first 2D image TS and the multiplexed second 2D image TS through at least two base stations connected via a wireless communication network.

6. A portable display apparatus, comprising:
- a wireless communication unit to receive a first two-dimensional (2D) image Transport Stream (TS), and a second 2D image TS, to generate a three-dimensional (3D) image;
- a demultiplexer (DEMUX) to demultiplex the first 2D image TS and the second 2D image TS, and to separate image information and control information;
- an image separating unit to separate first 2D image data and second 2D image data from the image information;
- an image quality analyzing unit to analyze an image quality for each of the first 2D image data and the second 2D image data; and
- a display unit to display, as a 2D image or a 3D image, the first 2D image data and the second 2D image data, based on the analyzed image quality.

7. The portable display apparatus of claim 6, wherein, when both the first 2D image data and the second 2D image data have good image qualities, the display unit combines the first 2D image data and the second 2D image data into a 3D image and displays the 3D image.

8. The portable display apparatus of claim 6, wherein, when either the first 2D image data or the second 2D image data has a good image quality, the display unit displays 2D image data with the good image quality.

9. The portable display apparatus of claim 6, wherein the image quality analyzing unit performs a Cyclic Redundancy Checking (CRC) on each of the first 2D image data and the second 2D image data, determines that the first 2D image data and the second 2D image data are good in the image quality when an error is not detected, and determines that the first 2D image data and the second 2D image data are poor in the image quality when the error is detected.

10. An image providing method of an image providing apparatus, the image providing method comprising:
- generating a first two-dimensional (2D) image Elementary Stream (ES) and a second 2D image ES by capturing the same target in different directions, to generate a three-dimensional (3D) image;
- packetizing the first 2D image ES and the second 2D image ES;
- generating a first 2D image Transport Stream (TS) and a second 2D image TS, respectively, based on the packetized first 2D image ES and the packetized second 2D image ES;
- multiplexing the generated first 2D image TS and the generated second 2D image TS; and
- individually transmitting, to a portable display apparatus, the multiplexed first 2D image TS and the multiplexed second 2D image TS through at least two base stations connected via a wireless communication network.

11. An image display method, comprising:
- receiving a first two-dimensional (2D) image Transport Stream (TS), and a second 2D image TS, to generate a three-dimensional (3D) image;
- demultiplexing the first 2D image TS and the second 2D image TS, and separating image information and control information;
- separating first 2D image data and second 2D image data from the image information;
- analyzing an image quality for each of the first 2D image data and the second 2D image data; and
- displaying, as a 2D image or a 3D image, the first 2D image data and the second 2D image data, based on the analyzed image quality.

12. The image display method of claim 11, wherein the displaying comprises, when both the first 2D image data and the second 2D image data have good image qualities, combining the first 2D image data and the second 2D image data into a 3D image and displaying the 3D image.

13. The image display method of claim 11, wherein the displaying comprises, when either the first 2D image data or the second 2D image data has a good image quality, displaying 2D image data with the good image quality.

14. The image display method of claim 11, wherein the analyzing comprises:
- performing a Cyclic Redundancy Checking (CRC) on each of the first 2D image data and the second 2D image data; and
- determining that the first 2D image data and the second 2D image data are good in the image quality when an error is not detected as a result of the CRC, and determining that the first 2D image data and the second 2D image data are poor in the image quality when the error is detected.

* * * * *